United States Patent
Wang

(10) Patent No.: US 10,104,302 B2
(45) Date of Patent: Oct. 16, 2018

(54) IMAGE DETERMINING METHOD AND IMAGE SENSING APPARATUS APPLYING THE IMAGE DETERMINING METHOD

(71) Applicant: PixArt Imaging Inc., Hsin-Chu (TW)

(72) Inventor: Guo-Zhen Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 247 days.

(21) Appl. No.: 15/161,277

(22) Filed: May 22, 2016

(65) Prior Publication Data

US 2017/0118389 A1   Apr. 27, 2017

(30) Foreign Application Priority Data

Oct. 27, 2015   (TW) .............................. 104135173 A

(51) Int. Cl.
*H04N 5/235* (2006.01)
*H04N 5/369* (2011.01)
*G06T 7/73* (2017.01)

(52) U.S. Cl.
CPC ............ *H04N 5/2351* (2013.01); *G06T 7/73* (2017.01); *H04N 5/3696* (2013.01); *G06T 2207/10012* (2013.01)

(58) Field of Classification Search
CPC ............ G06T 2207/10012; G06T 7/73; H04N 5/2351; H04N 5/3696
See application file for complete search history.

(56) References Cited

U.S. PATENT DOCUMENTS

| | | | | |
|---|---|---|---|---|
| 2005/0058337 A1* | 3/2005 | Fujimura | ........... | G06K 9/00201 382/159 |
| 2013/0182902 A1* | 7/2013 | Holz | .................... | G06K 9/3233 382/103 |
| 2015/0170344 A1* | 6/2015 | Lin | ......................... | G06T 5/007 348/169 |
| 2015/0304546 A1* | 10/2015 | Izawa | ...................... | G02B 7/34 348/229.1 |
| 2016/0277656 A1* | 9/2016 | Tsunoda | .................. | G06T 11/00 |
| 2017/0236293 A1* | 8/2017 | Holz | ...................... | G06T 7/194 382/103 |

* cited by examiner

*Primary Examiner* — Gelek W Topgyal
(74) *Attorney, Agent, or Firm* — Winston Hsu

(57) ABSTRACT

An image determining method, applied to an image sensing apparatus with a lens and an image sensor comprising a first pixel and a second pixel. First/second parts of the first/second pixels are respectively covered. The image determining method comprises: applying the first/second pixel to respectively generate a first/second object image, wherein the first/second object images are combined to generate a first combined object image; computing a first brightness information variation tendency of the first object image, a second brightness information variation tendency of the second object image and brightness information variation tendency of the first combined object image; and determining if the first combined object image is a front image or a rear image based on the first brightness information variation tendency, the second brightness information variation tendency and the brightness information variation tendency of the first combined object image.

16 Claims, 19 Drawing Sheets

IMAGE DETERMINING METHOD AND IMAGE SENSING APPARATUS APPLYING THE IMAGE DETERMINING METHOD

BACKGROUND OF THE INVENTION

1. Field of the Invention

The present invention relates to an image determining method and an image sensing apparatus, and particularly relates to an image determining method and an image sensing apparatus which can determine if the object image is a front image or a rear image.

2. Description of the Prior Art

More and more electronic apparatuses can be controlled by a gesture. For example, if a television is in a sleep state and the user stands in front of the television and makes a fist, the television is activated. For another example, if the television is operating and the user stands before the television and waves, the television switches the displayed channel. A camera is always provided for such function, which is applied to capture images ahead of the television to determine if any user's action matches the pre-determined gesture. However, if the real user's image and the rear image cannot be accurately distinguished, the gesture may be mis-determined.

FIG. 1 is a schematic diagram illustrating the gesture may be mis-determined while a gesture is applied to control the electronic apparatus, for prior art. As illustrated in FIG. 1, the above-mentioned camera 100 always comprises an image sensor IS and a lens L. The image sensor IS captures an image via the lens L. As above-mentioned, the captured image must be accurately determined to check if it is a real user's image or a rear image, or the gesture cannot be correctly determined. One common method is determining an image closer to the electronic apparatus as a front image, which is applied as a basement for determining a gesture. Also, an image faraway from the electronic apparatus is determined as a rear image, which is not applied as a basement for determining the gesture. The reason for determining an image far away from the electronic apparatus as the rear image is that the user is always close to the electronic apparatus while performing a gesture to control the electronic apparatus. By this way, the gesture can be accurately determined. On the opposite, if such mechanism is not applied, a far image may be applied as abasement for determining a gesture of the user.

Please refer to FIG. 1 again. The lens L comprises a focal point F and a corresponding focal distance FD. The above-mentioned determining steps for determining the front image and the rear image determines the image inside the focal distance FD (ex. the hand image H1) as a front image, and determines the image outside the focal distance FD (ex. the hand image H2) as a rear image.

Many methods can be applied to determine a distance for the object. For example, time-of flight or structured lighting can be applied to determine a distance for the object. However, such methods have some issues, for example, the power consumption is high or the distance for the object cannot be determined if the object is too close to the image sensor.

SUMMARY OF THE INVENTION

Therefore, one objective of the present invention is provide an image determining method for determining if the object image is a front image or a rear image.

Another objective of the present invention is to provide an image sensing apparatus with an image determining mechanism, for determining if the object image is a front image or a rear image.

On embodiment of the present invention discloses an image determining method, applied to an image sensing apparatus comprising a lens and an image sensor comprising at least one first pixel and at least one second pixel, wherein a first part for each the first pixel is covered and a second part for each the second pixel is covered. The image determining method comprises: (a) applying the first pixel to generate a first object image of an object; (b) applying the second pixel to generate a second object image of the object, wherein the first object image and the second object image form a first combined object image; (c) computing a first brightness information variation tendency for the first object image, a second brightness information variation tendency for the second object image, and a brightness information variation tendency for the first combined object image; and (d) determining if the first combined object image is a front image or a rear image according to the first brightness information variation tendency, the second brightness information variation tendency and the brightness information variation tendency for the first combined object image.

Another embodiment of the present invention discloses an image sensing apparatus, comprising: a lens; an image sensor, comprising a lens and an image sensor comprising at least one first pixel and at least one second pixel, wherein a first part for each the first pixel is covered and a second part for each the second pixel is covered, wherein the image sensor applies the first pixel to generate a first object image of an object, and applies the second pixel to generate a second object image of the object, wherein the first object image and the second object image form a first combined object image; a brightness information variation computing unit, configured to compute a first brightness information variation tendency for the first object image, a second brightness information variation tendency for the second object image, and a brightness information variation tendency for the first combined object image; a classifier, configured to determine if the first combined object image is a front image or a rear image according to the first brightness information variation tendency, the second brightness information variation tendency and the brightness information variation tendency for the first combined object image.

Still another embodiment of the present application provides an image sensing apparatus, comprising: a lens; and an image sensor, comprising at least one first pixel and at least one second pixel, wherein a first part for each the first pixel is covered and a second part for each the second pixel is covered, wherein the image sensor applies the first pixel to generate a first object image of an object, and applies the second pixel to generate a second object image of the object. The image sensing apparatus determines if the object is inside a focal distance of the lens or outside the focal distance of the lens.

In view of above-mentioned embodiments, the image determining method provided by the present invention can determine if the image is a front image or a rear image without consuming much power. Also, the range that can be determined is not limited. By this way, the disadvantage for prior, which means the power consumption is high and the distance cannot be determined if the object is closer to the image sensor, is solved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided to explain the content of the present invention. Please note, the following embodiments are only examples for explaining, but do not mean to limit the scope of the present invention.

Figure 1:
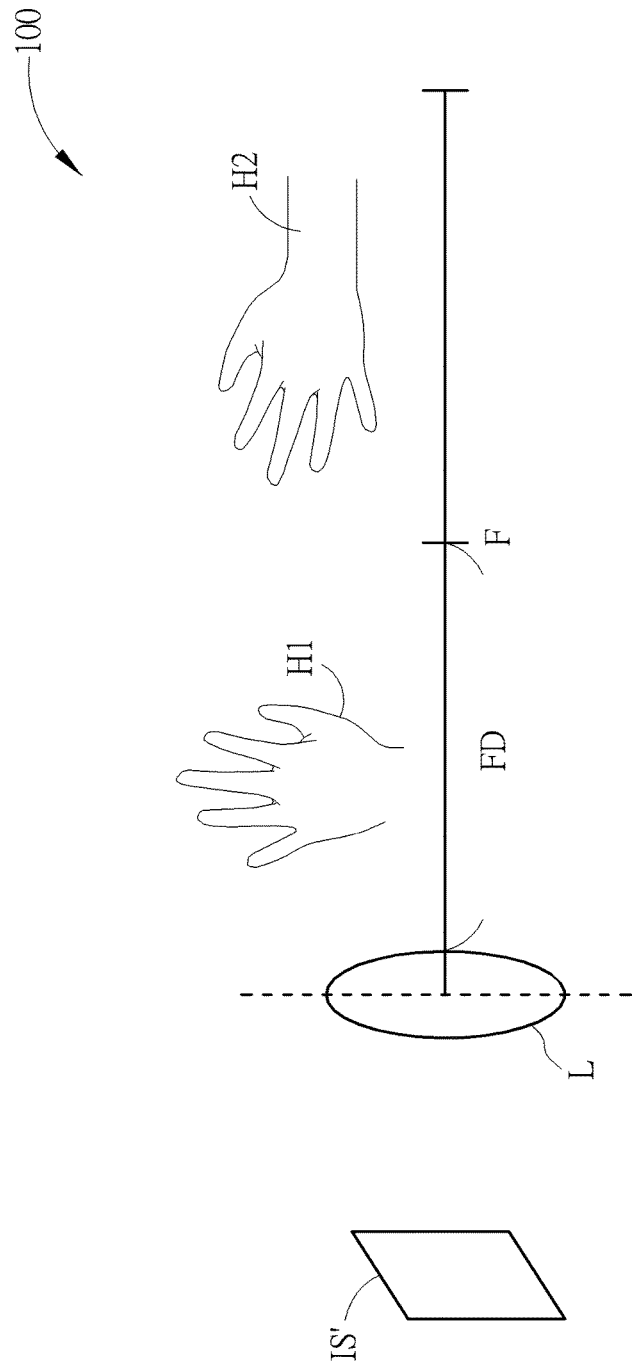
FIG. 1 is a schematic diagram illustrating the gesture may be mis-determined while a gesture is applied to control the electronic apparatus, for prior art.
Figure 2:
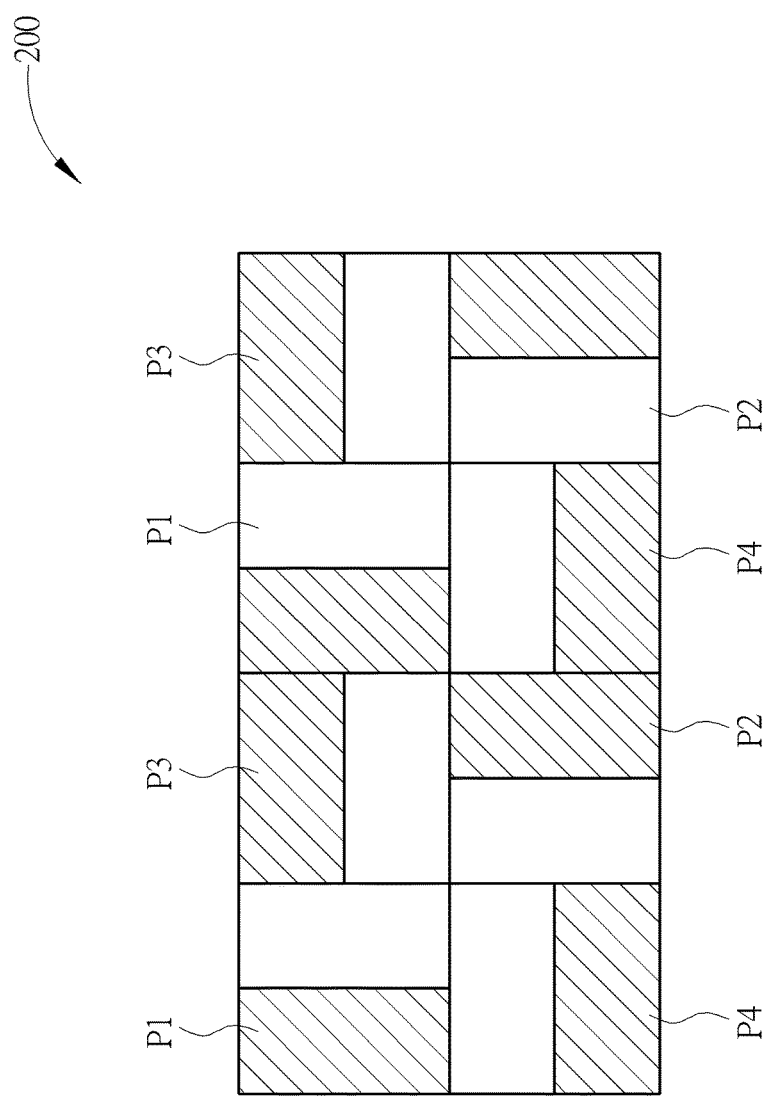
FIG. 2 is a schematic diagram illustrating a pixel structure for the image sensor according to one embodiment of the present invention.

FIG. 2 is a schematic diagram illustrating a pixel structure for the image sensor according to one embodiment of the present invention. As illustrated in FIG. 2, the pixel structure comprises at least one first pixel P1 and at least one second pixel P2. The left half part for each first pixel P1 is covered and the right half part for each second pixel P2 is covered. All first pixels P1 in the image sensor generate a first object image (in this example, a right image), and all second pixels P2 in the image sensor generate a second object image (in this example, a left image). If the first object image and the second object image are both imaged at a focal point of the lens, these two object images coincide and generate a clear combined object image. However, if the first object image and the second object image are imaged at locations besides focal points, these two object images do not coincide and generate a blurred combined object image.

Figure 3:
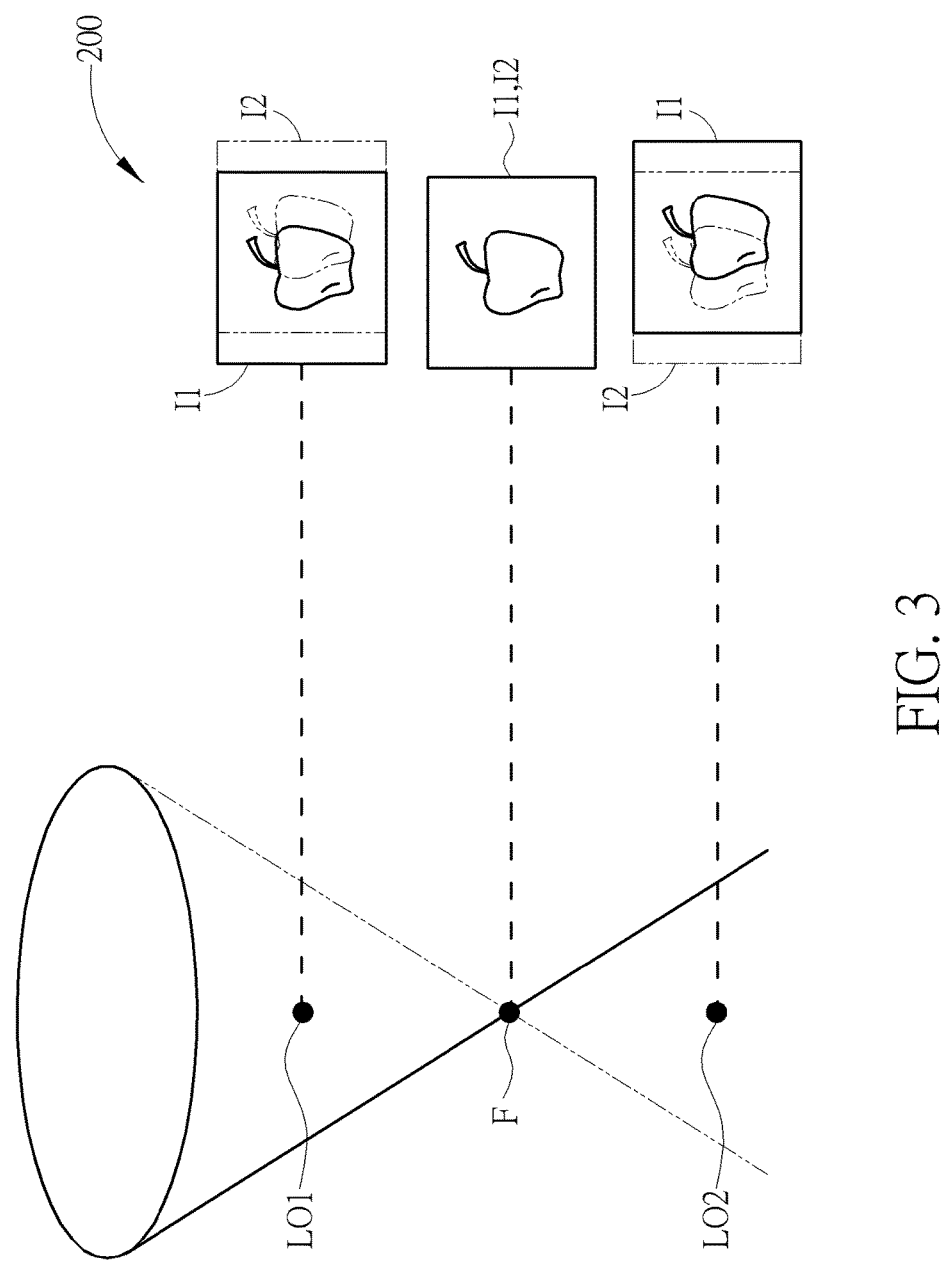
FIG. 3 is a schematic diagram illustrating imaging for an object at a focal point and imaging for an object at a point which is not the focal point.

FIG. 3 is a schematic diagram illustrating imaging for an object at a focal point and imaging for an object at a point which is not the focal point. As illustrated in FIG. 3, the first object image I1 and the second object image I2 almost completely coincide if they are imaged at the focal point F of the lens L. However, shifting exists between the first object image I1 and the second object image I2 (i.e. have different phases), if they are not imaged at the focal point F (ex. at locations Lo1 and Lo2). Accordingly, the first object image I1 and the second object image I2 do not coincide such that a blurred combined object image is formed. Accordingly, in the following embodiment, such situation is applied to determine a relative location for the object and the lens. That is, determine if the combined object image is a front image or a rear image. Detail steps will be described later.

Please note, the image sensor provided by the present invention can comprise other types of pixels besides the first pixel P1 and the second pixel P2 illustrated in FIG. 2. For example, the image sensor 200 further comprises at least one third pixel P3 and at least one fourth pixel P4 besides the first pixel P1 and the second pixel P2. The upper half part of the third pixel P3 and the lower half part of the fourth pixel P4 are covered. The third pixel P3 and the fourth pixel P4 can be applied to determine a location of the object, as illustrated in FIG. 3. The difference between the first pixel P1/the second pixel P2 and the third pixel P3/the fourth pixel P4 is that the first pixel P1/the second pixel P2 are sensitive for detecting a vertical edge of the object image, but the third pixel P3/the fourth pixel P4 are sensitive for detecting a horizontal edge of the object image.

Figure 4:
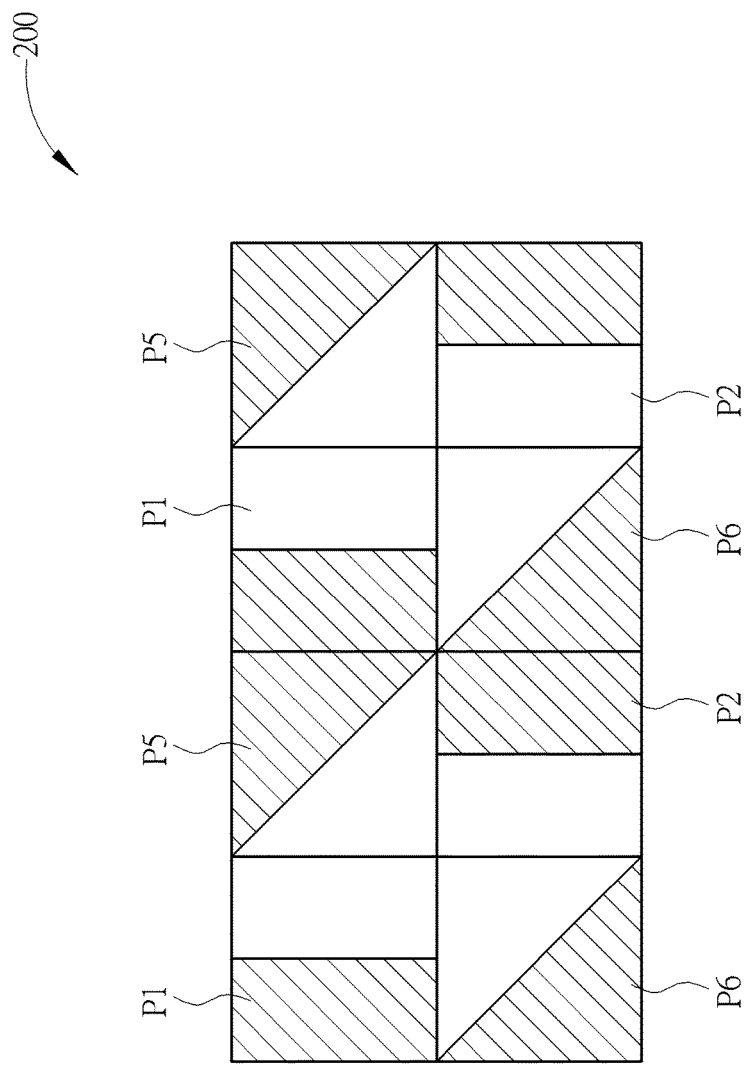
FIG. 4 is a schematic diagram illustrating a pixel structure of an image sensor according to another embodiment of the present invention.

Besides the first pixel P1 and the second pixel P2, at least one fifth pixel P5 and at least one sixth pixel P6 are further provided in the embodiment of FIG. 4. The upper right part of the fifth pixel P5 and the lower left part of the sixth pixel P6 are covered. The fifth pixel P5 and the lower left part of the sixth pixel P6 can be applied to determine a location of the object, as illustrated in FIG. 3. The difference between the first pixel P1/the second pixel P2 and the fifth pixel P5/the sixth pixel P6 is that the first pixel P1/the second pixel P2 are sensitive for detecting a vertical edge of the object image, but the fifth pixel P5/the sixth pixel P6 are sensitive for detecting an oblique edge of the object image. In view of above-mentioned description, the image sensor provided by the present invention is not limited to above-mentioned embodiment, and can comprise different image structures.

Different embodiments are provided in following description to explain how to determine a location of the object according to brightness information of object images. Please note, in following embodiments, a first object image formed via the first pixel P1 and a second object image formed via the second pixel P2 are taken for examples to explain, but other types of pixels can be applied to the present invention. Additionally, in the following embodiments, the object O comprises an edge part. That is, the object O comprises two parts which have a high contrast ratio, for example, a darker left part L and a brighter right part R in FIG. 5A, FIG. 5B and FIG. 5C. However, it does not mean that the present invention limits that the object O must comprise an edge part.

FIG. 5A, FIG. 5B, FIG. 5C, FIG. 6A, FIG. 6B and FIG. 6C are schematic diagrams illustrating determining a distance between an object and a lens based on average brightness according to one embodiment of the present invention. The horizontal axis in FIG. 5A, FIG. 5B, FIG. 5C, FIG. 6A, FIG. 6B and FIG. 6C indicates different pixel rows. The vertical axis in FIG. 5A, FIG. 5B, FIG. 5C, indicates average brightness for different pixel rows. Also, the vertical axis in FIG. 6A, FIG. 6B, and FIG. 6C indicates an average brightness ratio for pixel rows of the first object image and the second object image. A relation between the pixel line of the first object image and the first object image, and a relation between the pixel line of the second object image and the second object image are the same (i.e. the same pixel row for the first object image and the second object image, such as the first pixel row). Besides, in this embodiment, the focal distance is supposed to be 30 cm.

Figure 5A:
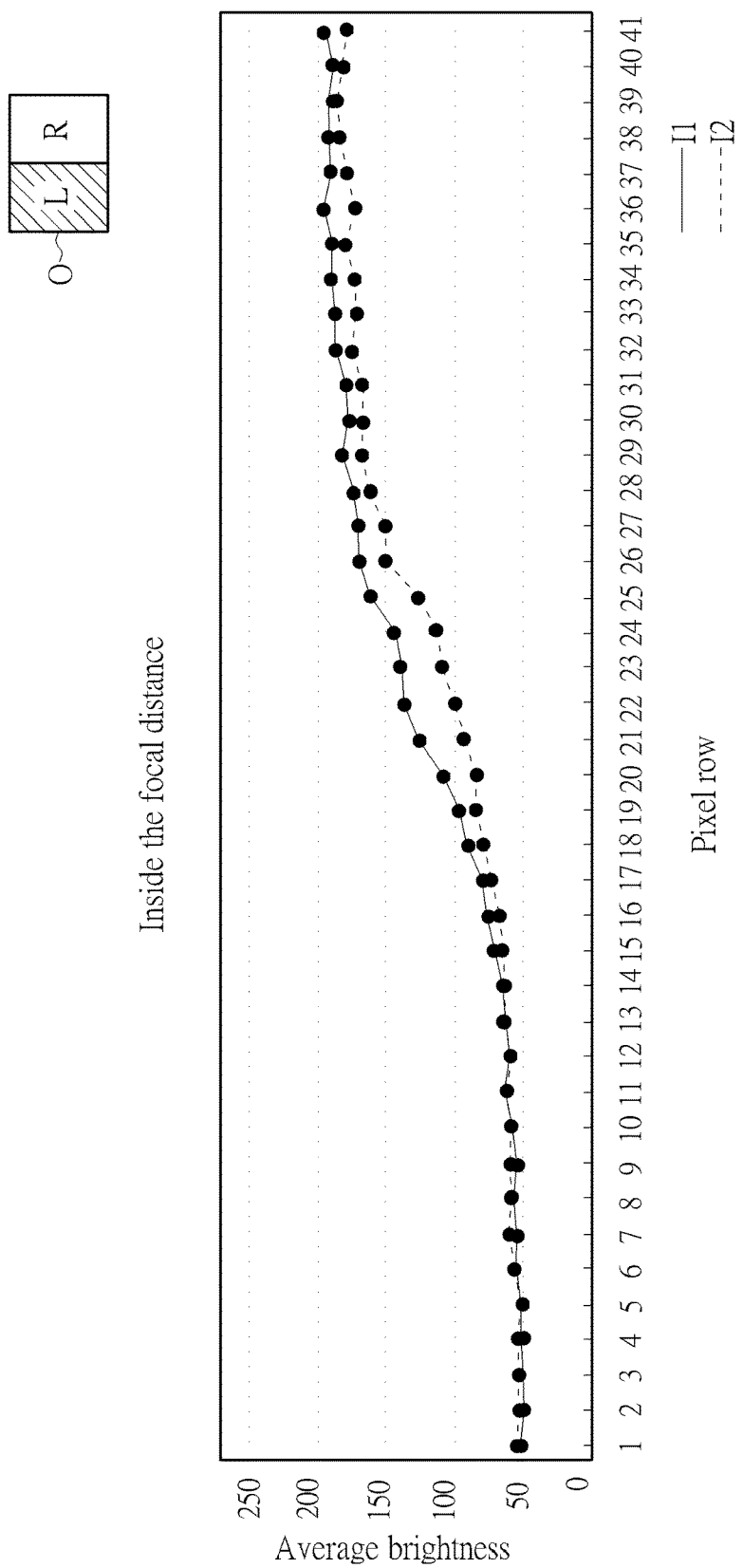
FIG. 5A, FIG. 5B, FIG. 5C, FIG. 6A, FIG. 6B and FIG. 6C are schematic diagrams illustrating determining a distance between an object and a lens based on average brightness according to one embodiment of the present invention.
Figure 5B:
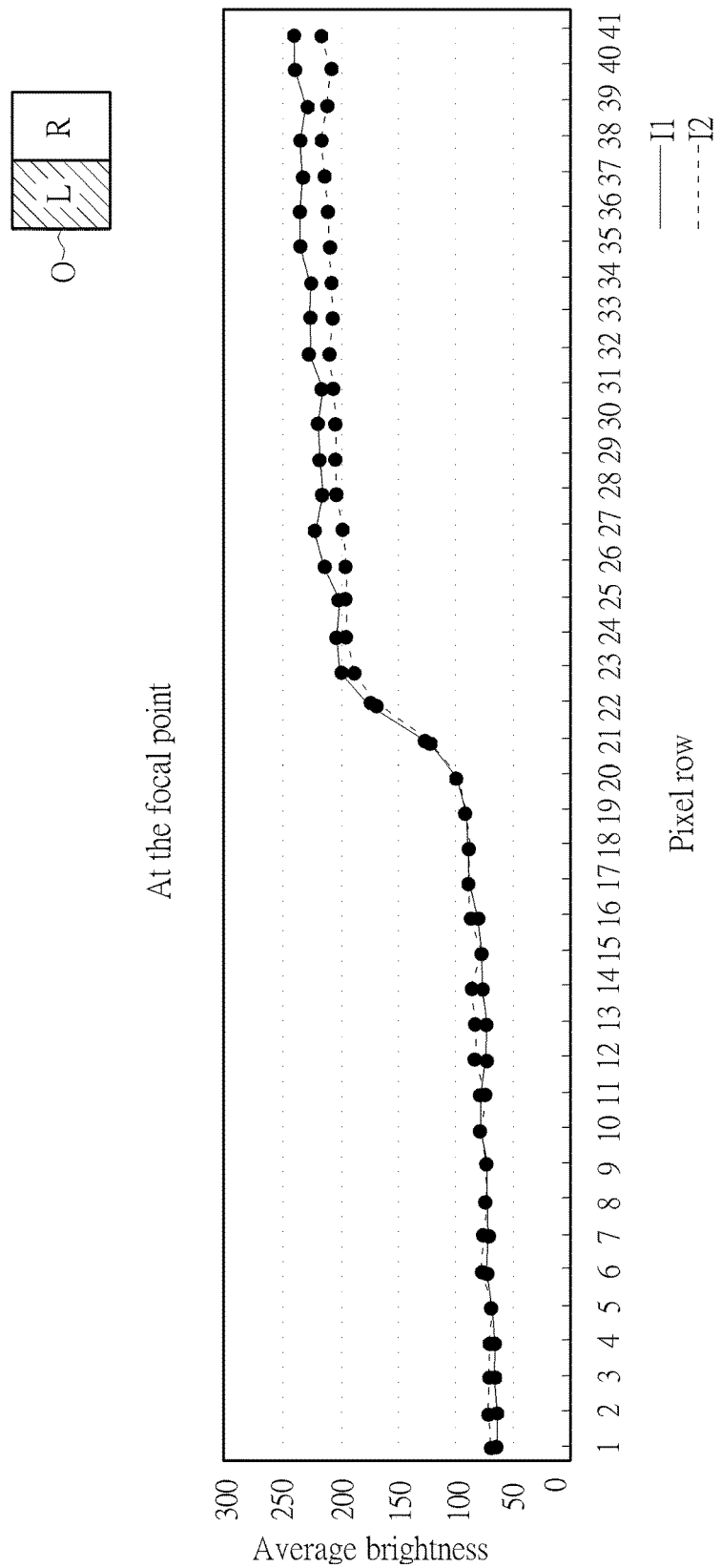
Figure 5C:
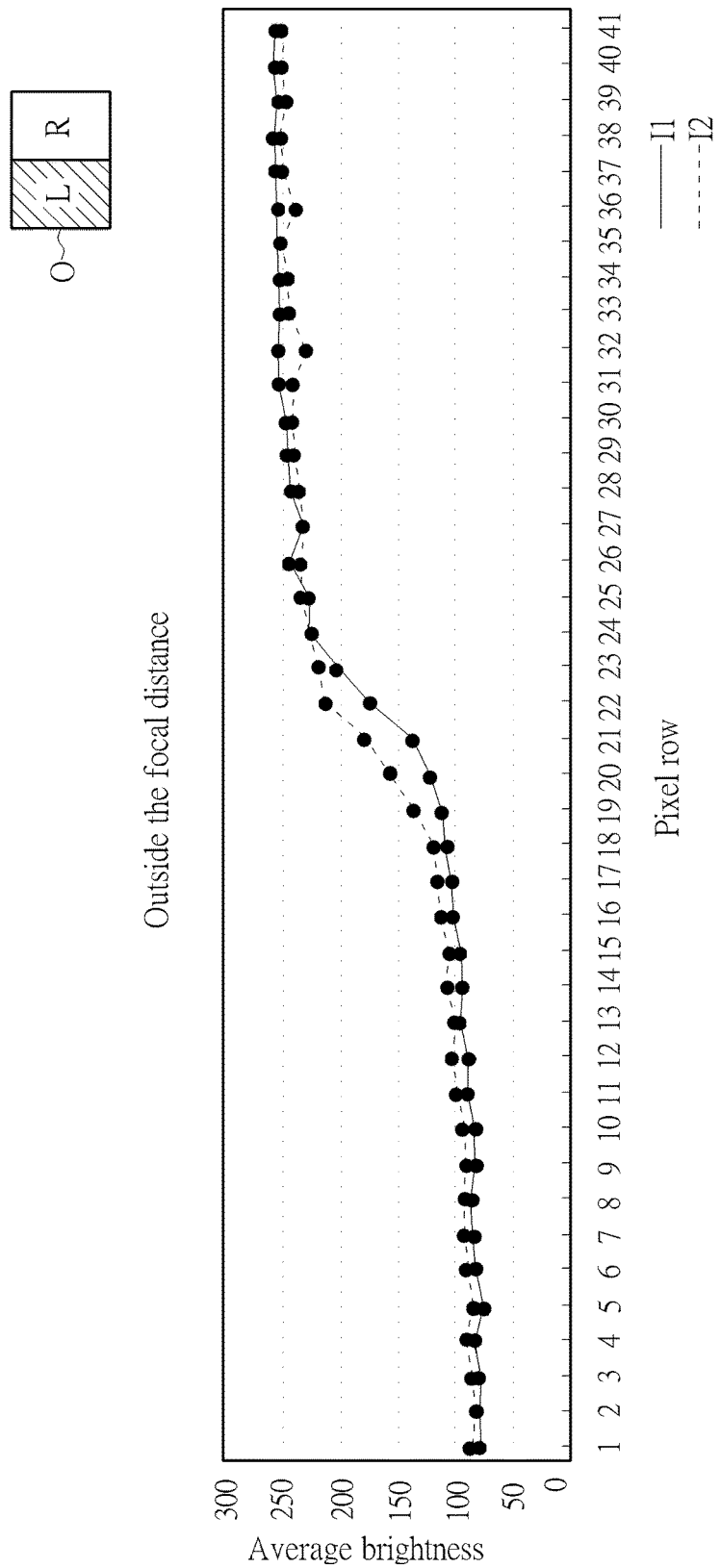

Please refer to FIG. 5A, FIG. 5B and FIG. 5C again. FIG. 5A illustrates the variation for average brightness while the object is inside a focal distance of a lens (ex. 5 cm). FIG. 5B illustrates the variation for average brightness while the object is at the focal point of the lens. Besides, FIG. 5C illustrates the variation for average brightness while the object is outside a focal distance of a lens (ex. 50 cm). As illustrated in FIG. 3, the first object images I1 formed by the first pixel P1 and the second object images I2 formed by the second pixel P2 have different phases while the first object image I1 and the first object image I2 are inside the focal distance, at the focal point and outside the focal distance. Therefore, the first object images I1 and the second object images I2 at different locations have different average brightness variation. In FIG. 5A and FIG. 5C, the average brightness for the first object image I1 and the first object image I2 has a smaller slope (i.e. the variation tendency is weak). On the opposite, in FIG. 5B, the average brightness for the first object image I1 and the second object image I2 has a larger slope (i.e. the variation tendency is strong). Therefore, if these rules are pre-recorded, the object can be determined if it is at the focal point or locations besides the focal point (i.e. be determined if the combined object image belongs to a front image or a rear image) according to which rule does the average brightness variation tendency matches, after the average brightness variations for the first object image I1 and the second object image I2 are acquired.

Besides the average brightness variation tendency for the first object image I1 and the second object image I2, the combined object image can be determined if it is a front image or a rear image further according to the average brightness variation tendency for the combined object image. Take FIG. 5A as example, O at the upper right corner is the combined image, thus the average brightness variation tendency for the combined image is: a dark left part and a bright right part. After the average brightness variation tendency is acquired, if the average brightness variation tendencies for the first object image I1 and the second object image I2 match the predetermined rule, the combined object image is determined if it is a front image or a rear image. That is, in such embodiment, the combined object image is determined if it is a front image or a rear image only when the average brightness variation tendency for the combined object image and the average brightness variation tendency for the first object image I1 and the second object image I2 match predetermined rules.

Figure 6A:
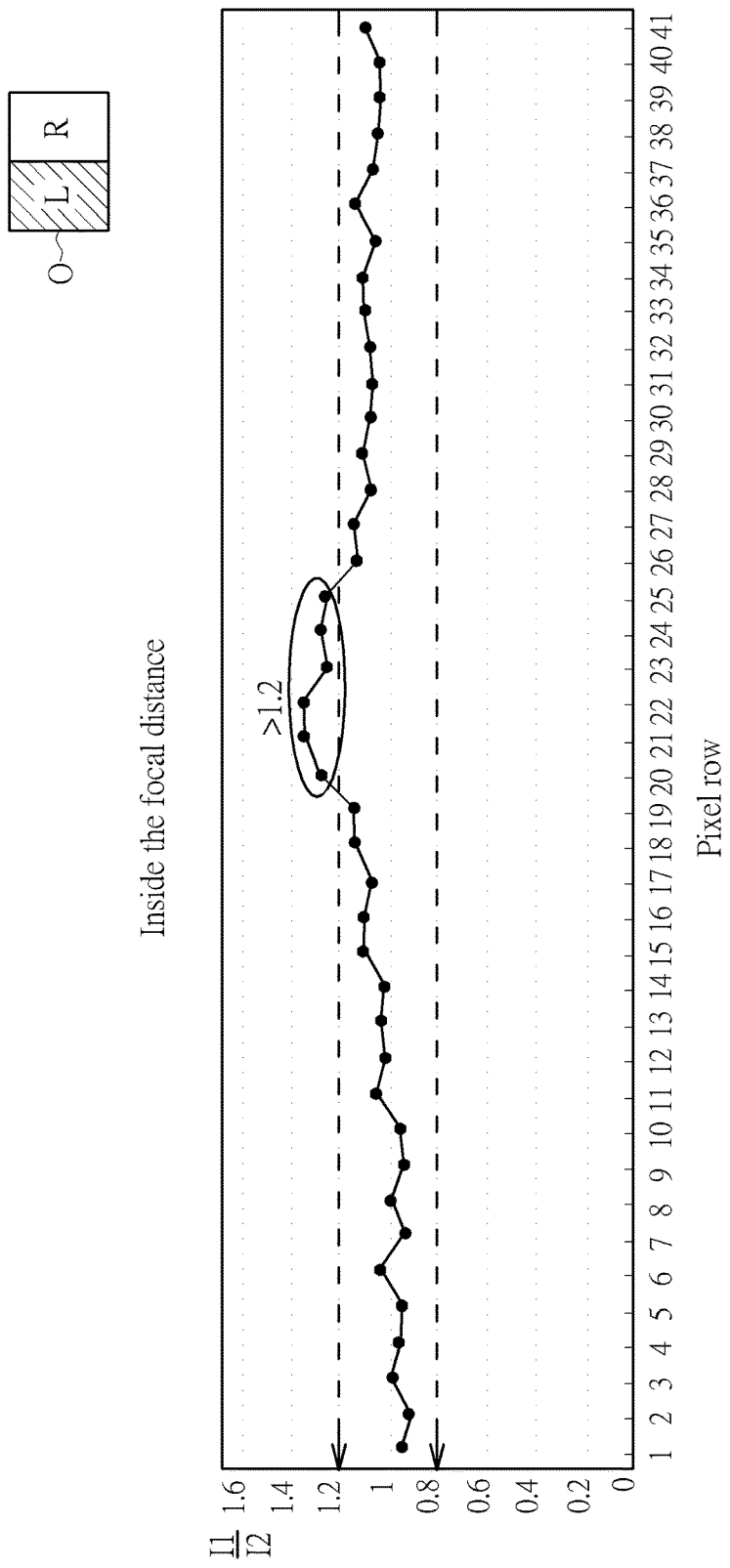
Figure 6B:
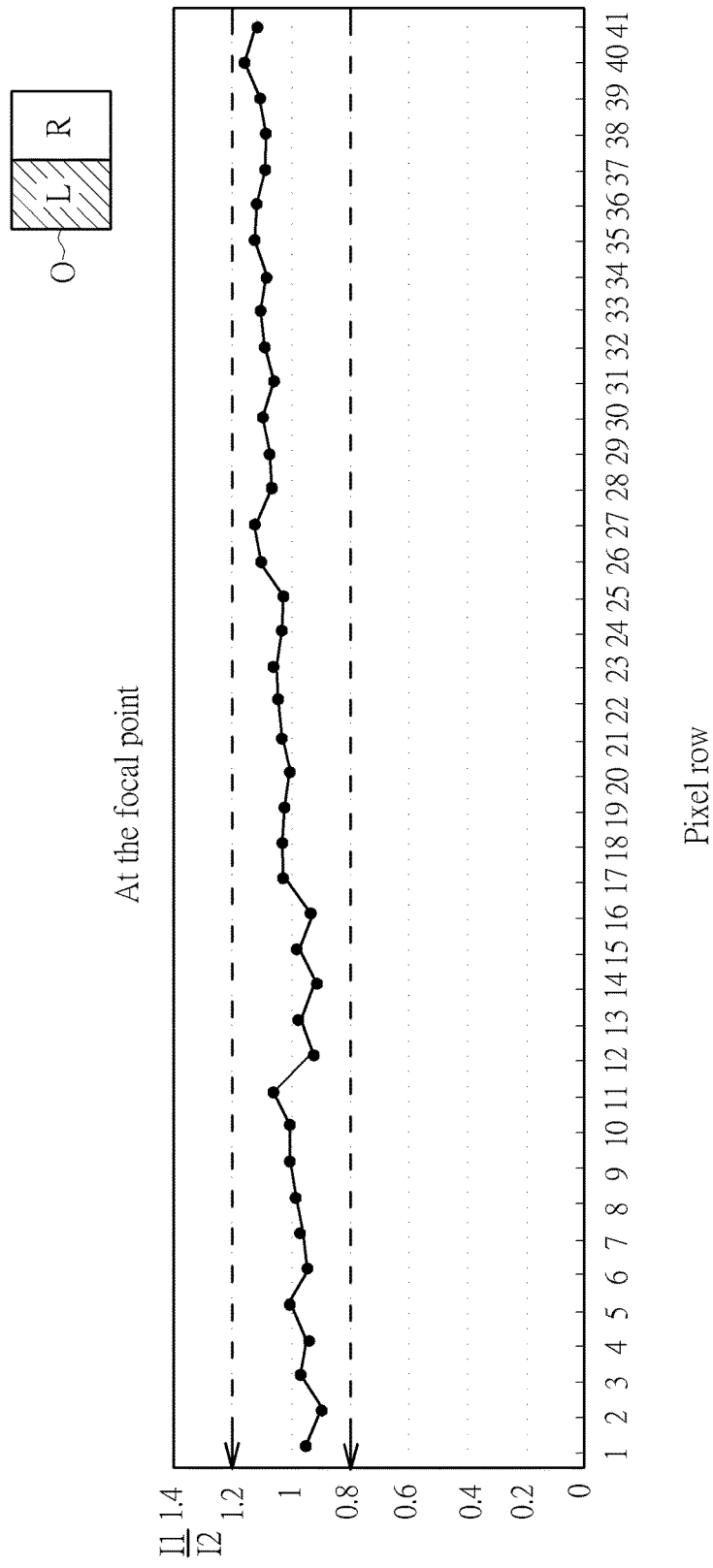
Figure 6C:
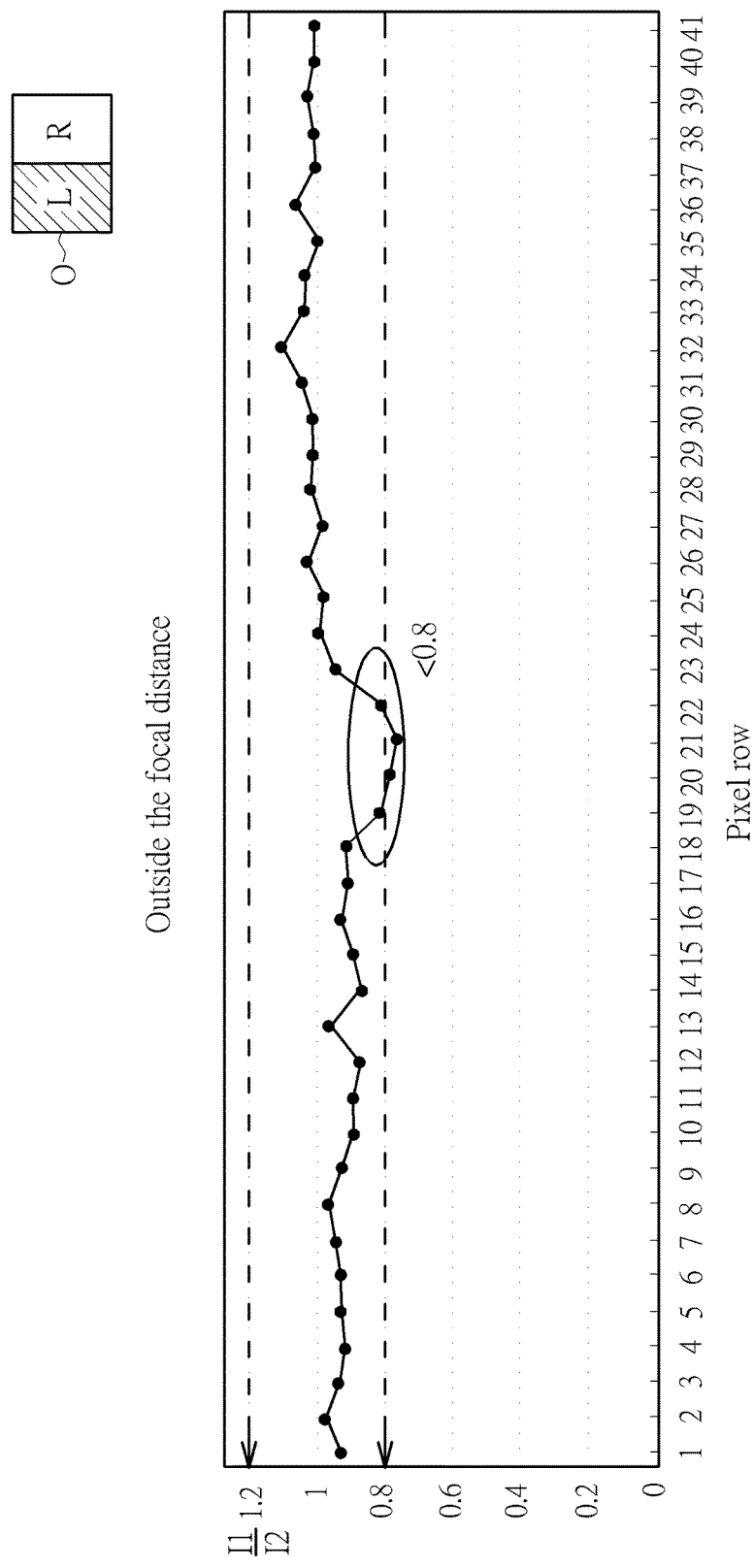

Besides the average brightness variation tendency illustrated in FIG. 5A, FIG. 5B and FIG. 5C can be applied to determine the object location, other average brightness related information can be applied to determine the object location as well. Please refer to FIG. 6A, FIG. 6B and FIG. 6C, which respectively corresponds to FIG. 5A, FIG. 5B and FIG. 5C. FIG. 6A illustrates an average brightness ratio of the same pixel rows for the first object image I1 and the second object image I2 (ex. the first pixel row) while the object is inside a focal distance of the lens. FIG. 6B illustrates an average brightness ratio of the same pixel rows for the first object image I1 and the second object image I2 while the object is at a focal point of the lens. FIG. 6C illustrates an average brightness ratio of the same pixel rows for the first object image I1 and the second object image I2 while the object is outside a focal distance of the lens.

The difference for average brightness of the same pixel rows for the first object image I1 and the second object image I2 is the smallest in FIG. 5B, thus the average brightness ratio for the same pixel rows for the first object image I1 and the second object image I2 in FIG. 6B is about 1 (0.8~1.2). On the contrary, the difference for average brightness of the same pixel rows for the first object image I1 and the second object image I2 is larger in FIG. 5A and FIG. 5C, thus the average brightness ratio for the same pixel rows for the first object image I1 and the second object image I2 in FIG. 6A and FIG. 6C is over the range of 0.8~1.2. For more detail, the average brightness ratio for part pixel rows in FIG. 6A (such as pixel rows 20-25) is over 1.2, that is, the average brightness for part of pixel rows in the first object image I1 is higher than the average brightness for the same pixel rows in the second object image I2 in FIG. 5A. On the opposite, the average brightness ratio for part pixel rows in FIG. 6C (such as pixel rows 20-21) is smaller than 0.8, that is, the average brightness for part of pixel rows in the first object image I1 is lower than the average brightness for the same pixel rows in the second object image I2 in FIG. 5C.

Therefore, besides the average brightness variation tendency illustrated in FIG. 5A, FIG. 5B and FIG. 5C, the average brightness variation ratio illustrated in FIG. 6A, FIG. 6B and FIG. 6C can be applied to determine a location of the object as well. By this way, the combined object image can be determined if it is a front image or a rear image more accurately.

Figure 7A:
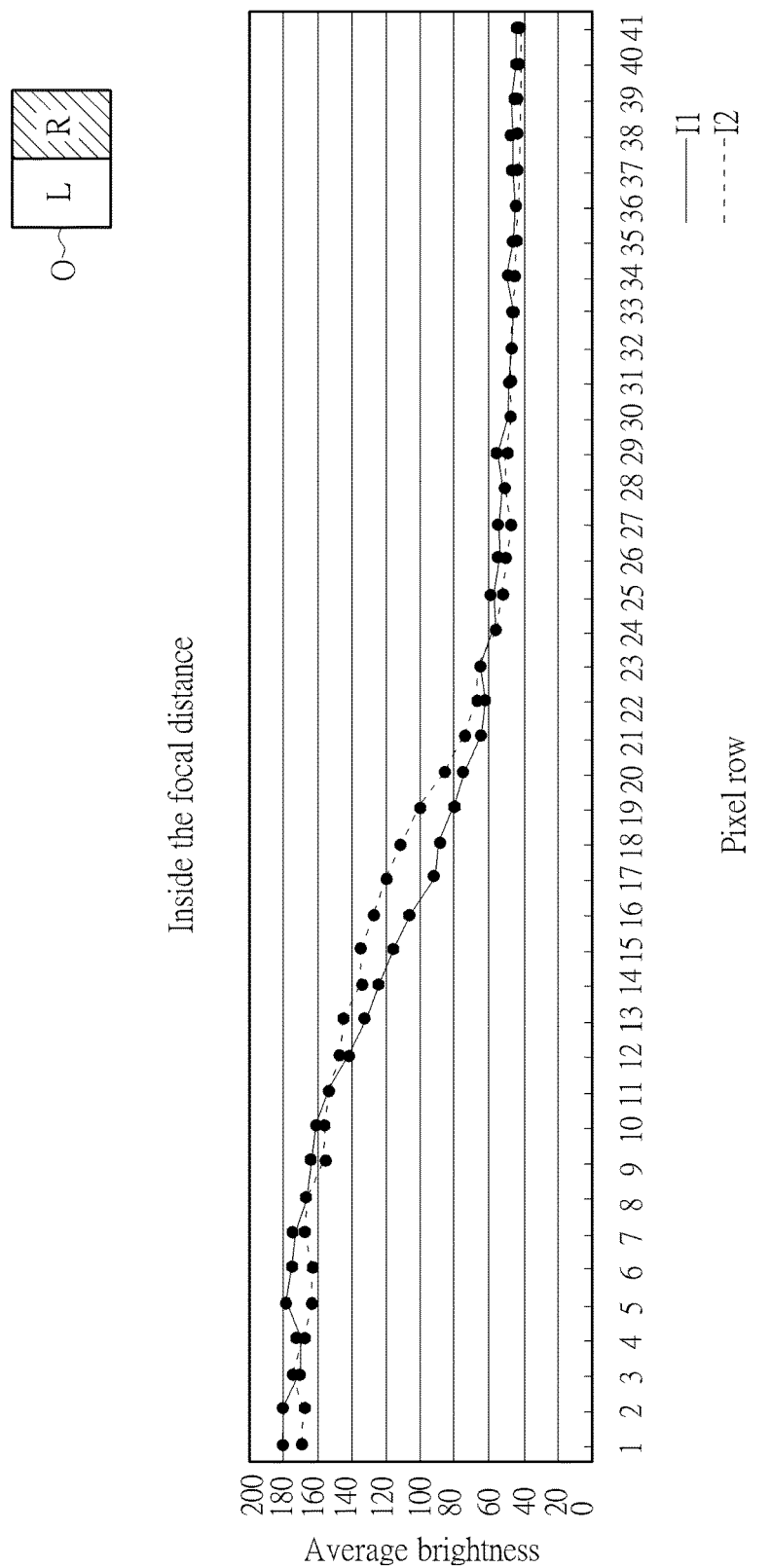
FIG. 7A, FIG. 7B, FIG. 7C, FIG. 8A, FIG. 8B and FIG. 8C are schematic diagrams illustrating determining a distance between an object and a lens based on average brightness according to another embodiment of the present invention.
Figure 7B:
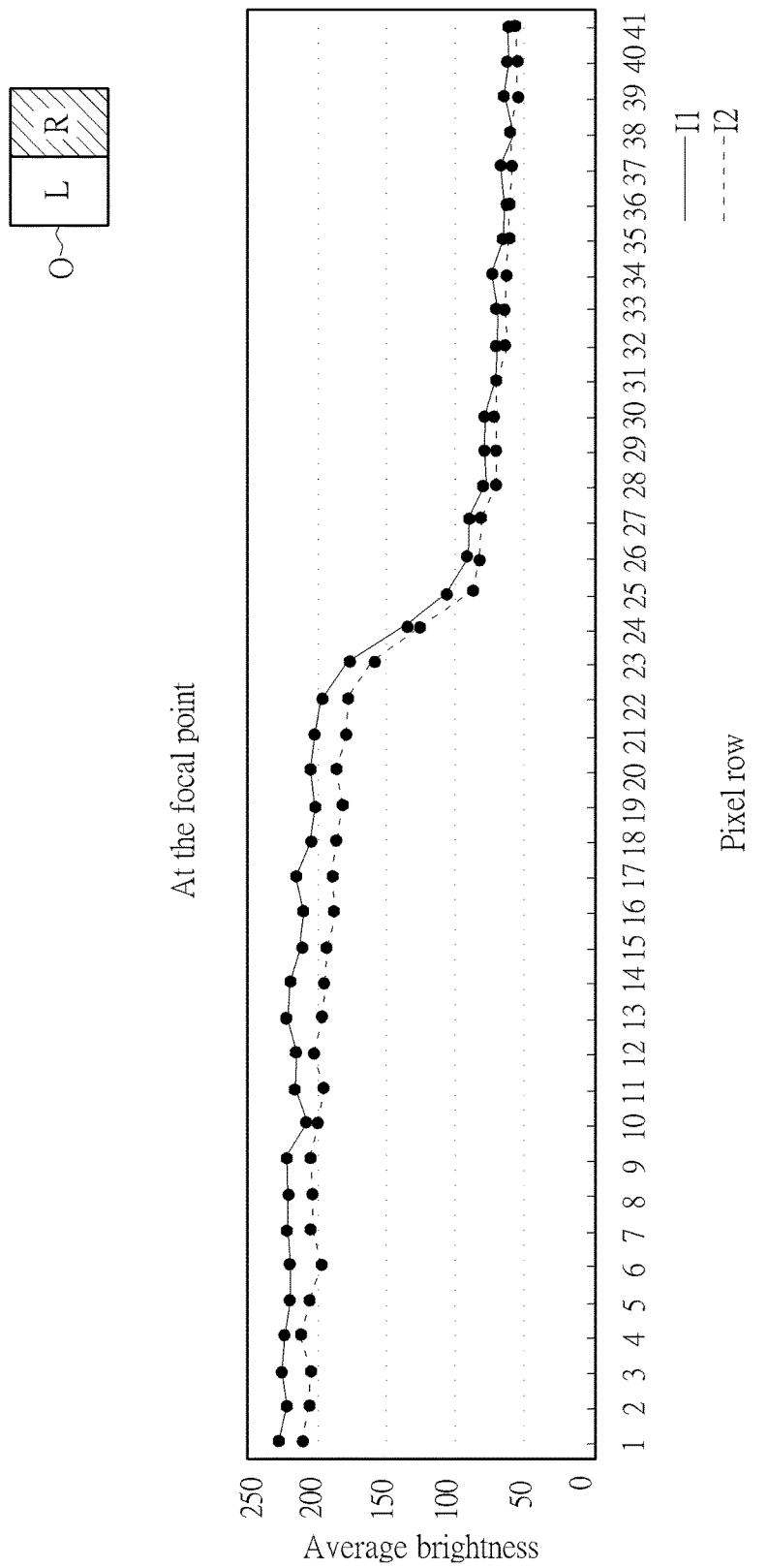
Figure 7C:
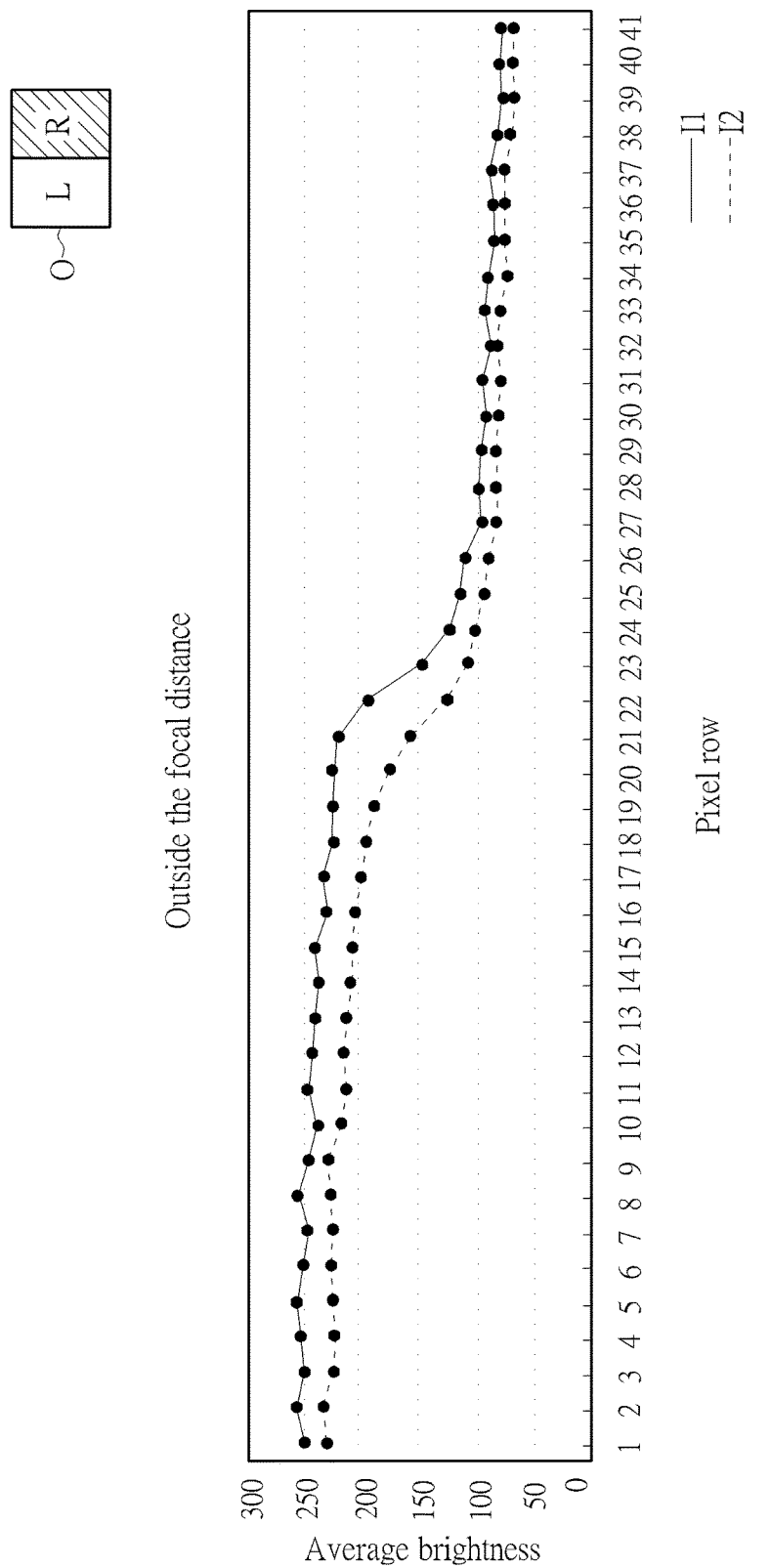
Figure 8A:
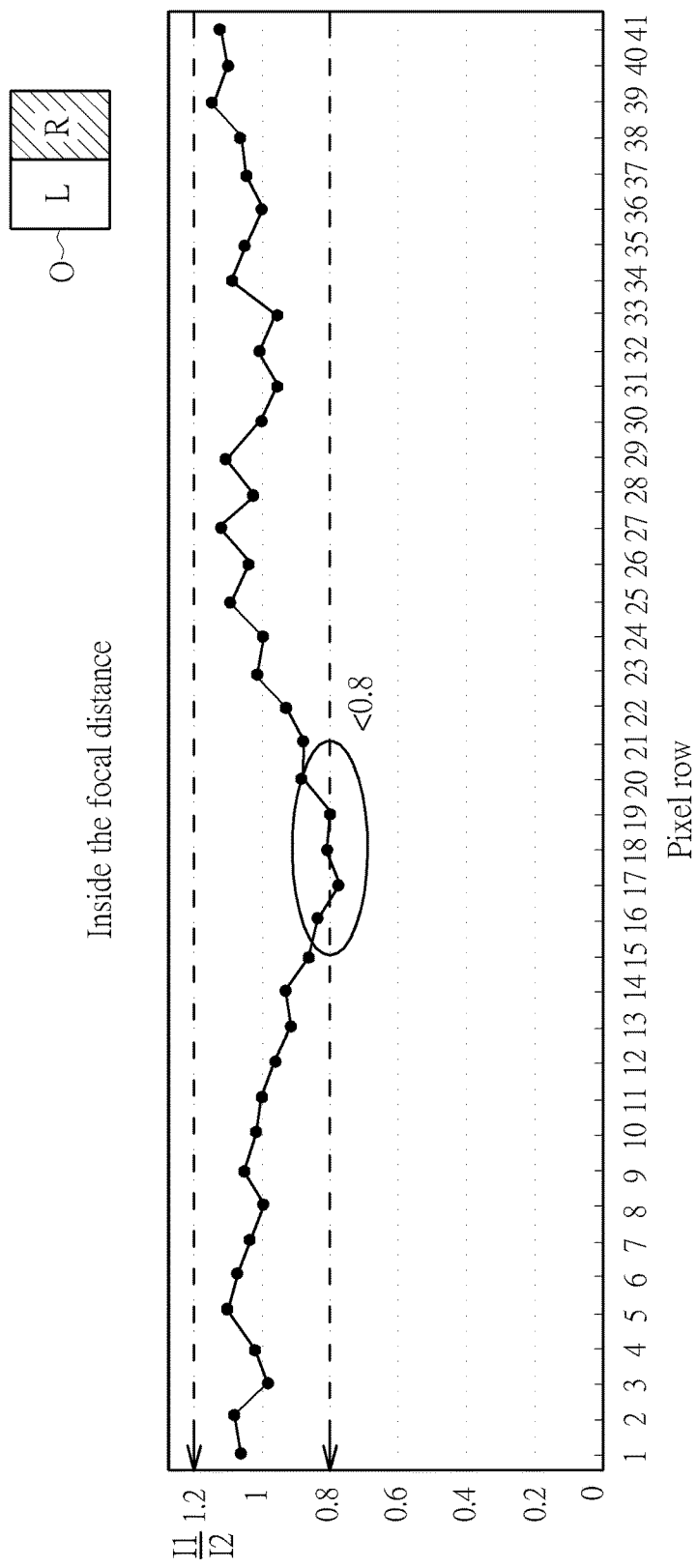
Figure 8B:
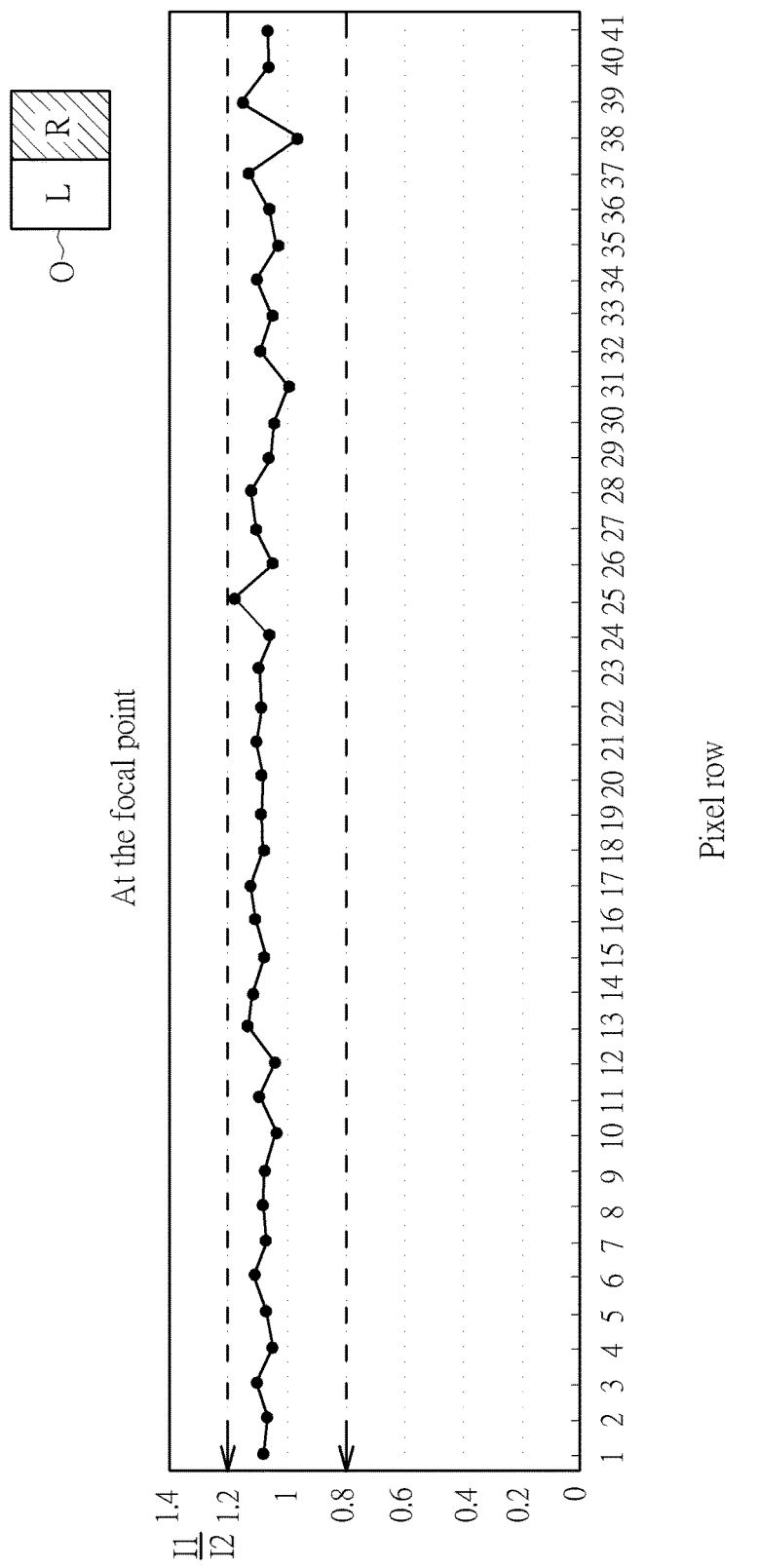
Figure 8C:
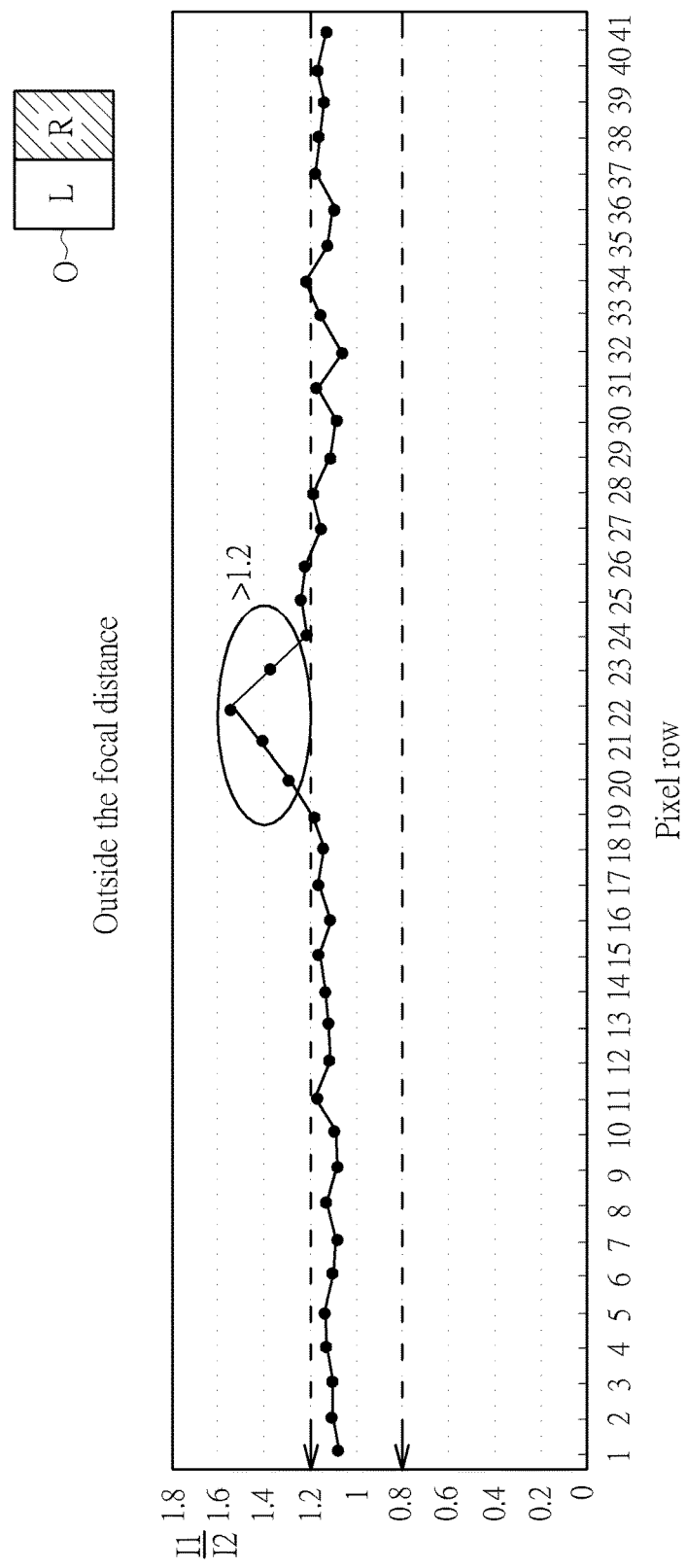

Please note, the content of the object is not limited to the above-mentioned object O. For example, the object O in FIG. 7A, FIG. 7B, FIG. 7C, FIG. 8A, FIG. 8B and FIG. 8C comprises a brighter left part L and a darker right part R. That is, the content for the object O in FIG. 7A, FIG. 7B, FIG. 7C, FIG. 8A, FIG. 8B and FIG. 8C is opposite to the content for the object O in FIG. 5A, FIG. 5B, FIG. 5C, FIG. 6A, FIG. 6B and FIG. 6C. Therefore, the distribution for average brightness of FIG. 7A, FIG. 7B and FIG. 7C is substantially opposite to the distribution for average brightness of FIG. 5A, FIG. 5B and FIG. 5C. Similarly, in FIG. 7A and FIG. 7C, the average brightness for the first object image I1 and the second object image I2 has a smaller slope. On the contrary, in FIG. 7B, the average brightness for the first object image I1 and the second object image I2 has a largest slope (i.e. the variation tendency is strong). Also, the average brightness ratios illustrated in FIG. 8A, FIG. 8B and FIG. 8C are opposite to the average brightness ratios illustrated in FIG. 6A, FIG. 6B and FIG. 6C. The average brightness ratio for part pixel rows in FIG. 8A (such as pixel rows 17-19) is smaller than 0.8, that is, the average brightness for part of pixel rows in the first object image I1 is lower than the average brightness for the same pixel rows in the second object image I2 in FIG. 7A. On the opposite, the average brightness ratio for part pixel rows in FIG. 8C (such as pixel rows 20-23) is over 1.2, that is, the average brightness for part of pixel rows in the first object image I1 is higher than the average brightness for the same pixel rows in the second object image I2 in FIG. 7C.

Figure 9:
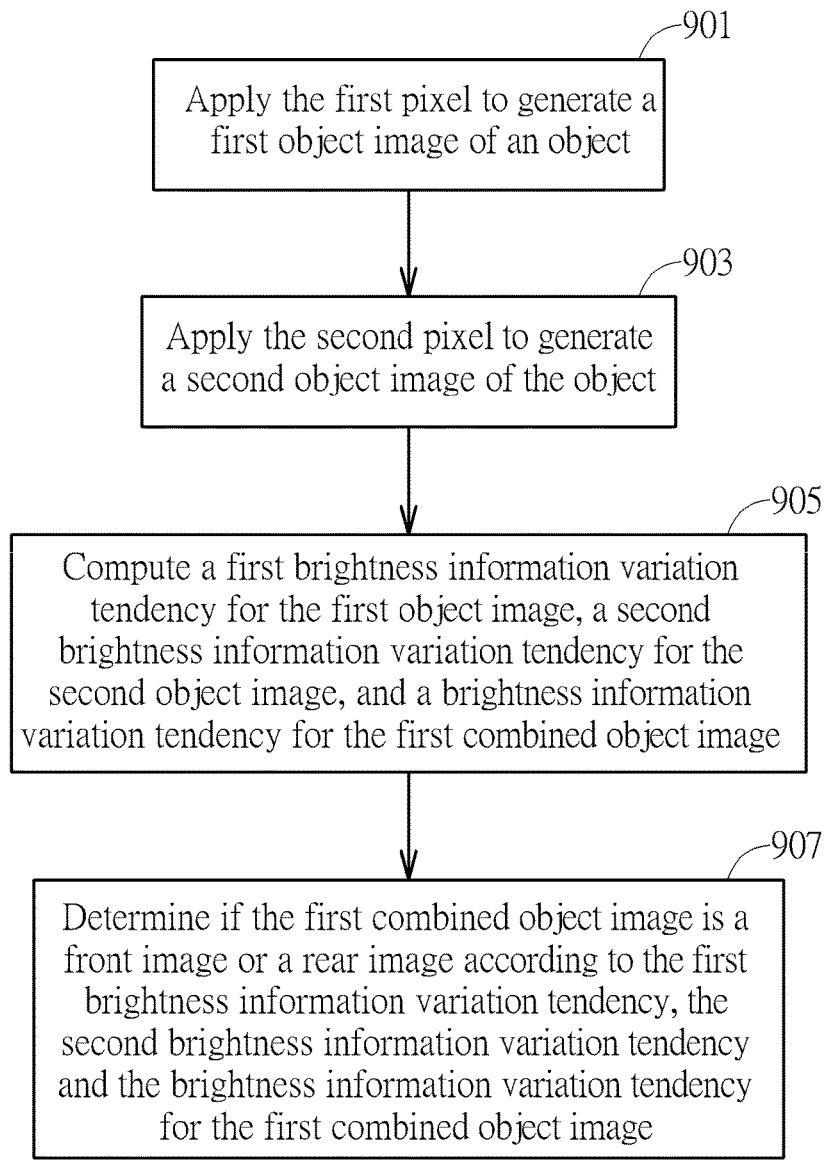
FIG. 9 is a flow chart illustrating an image determining method according to one embodiment of the present invention.

Please note, the above-mentioned average brightness can be replaced by other brightness information, for example, a maximum brightness or a minimum brightness for a pixel row. Additionally, the pixel row can be replaced with pixel column. Accordingly, in view of above-mentioned embodiments, an image determining method disclosed in FIG. 9 can be acquired, which is applied to an image sensing apparatus comprising a lens and an image sensor comprising at least one first pixel and at least one second pixel (ex. P1 and P2 in FIG. 2, but not limited). A first part for each the first pixel is covered and a second part for each the second pixel is covered. As illustrated in FIG. 9, the image determining method comprises:

Step 901

Apply the first pixel to generate a first object image of an object.

Step 903

Apply the second pixel to generate a second object image of the object, wherein the first object image and the second object image form a first combined object image Step 905

Compute a first brightness information variation tendency for the first object image, a second brightness information variation tendency for the second object image, and a brightness information variation tendency for the first combined object image. For example, computing an average brightness variation tendency as illustrated in FIG. 5A, FIG. 5B, FIG. 5C, FIG. 7A, FIG. 7B and FIG. 7C. For another example, computing average brightness ratios as illustrated in FIG. 6A, FIG. 6B, FIG. 6C, FIG. 8A, FIG. 8B and FIG. 8C.

Step 907

Determine if the first combined object image is a front image or a rear image according to the first brightness information variation tendency, the second brightness information variation tendency and the brightness information variation tendency for the first combined object image. That is, the embodiment for each figure refers the average brightness variation tendency for the combined object image at the upper right corner thereof to determine if the combined object image is a front image or a rear image.

According steps 901-907, the operation for the image sensing apparatus can be summarized as: determine if the object is inside the focal distance of the lens or outside the focal distance of the length according to the first object image and the second object image (i.e. determine if the combined object image is a front image or a rear image).

In one embodiment, the image sensor further comprises at least one third pixel and at least one fourth pixel (ex. P3, P4 in FIG. 2 or P5, P6 in FIG. 4), wherein a third part for each the third pixel is covered and a fourth part for each the fourth pixel is covered. In such embodiment, the third pixel is applied to generate a third object image of the object. Also, the fourth pixel is applied to generate a fourth object image of the object. The third object image and the fourth object image form a second combined object image. Additionally, such embodiment computes a third brightness information variation tendency for the third object image, a fourth brightness information variation tendency for the fourth object image, and a brightness information variation tendency for the second combined object image. Also, such embodiment determines if the second combined object image is a front image or a rear image according to the third brightness information variation tendency, the fourth brightness information variation tendency and the brightness information variation tendency for the second combined object image.

Figure 10:
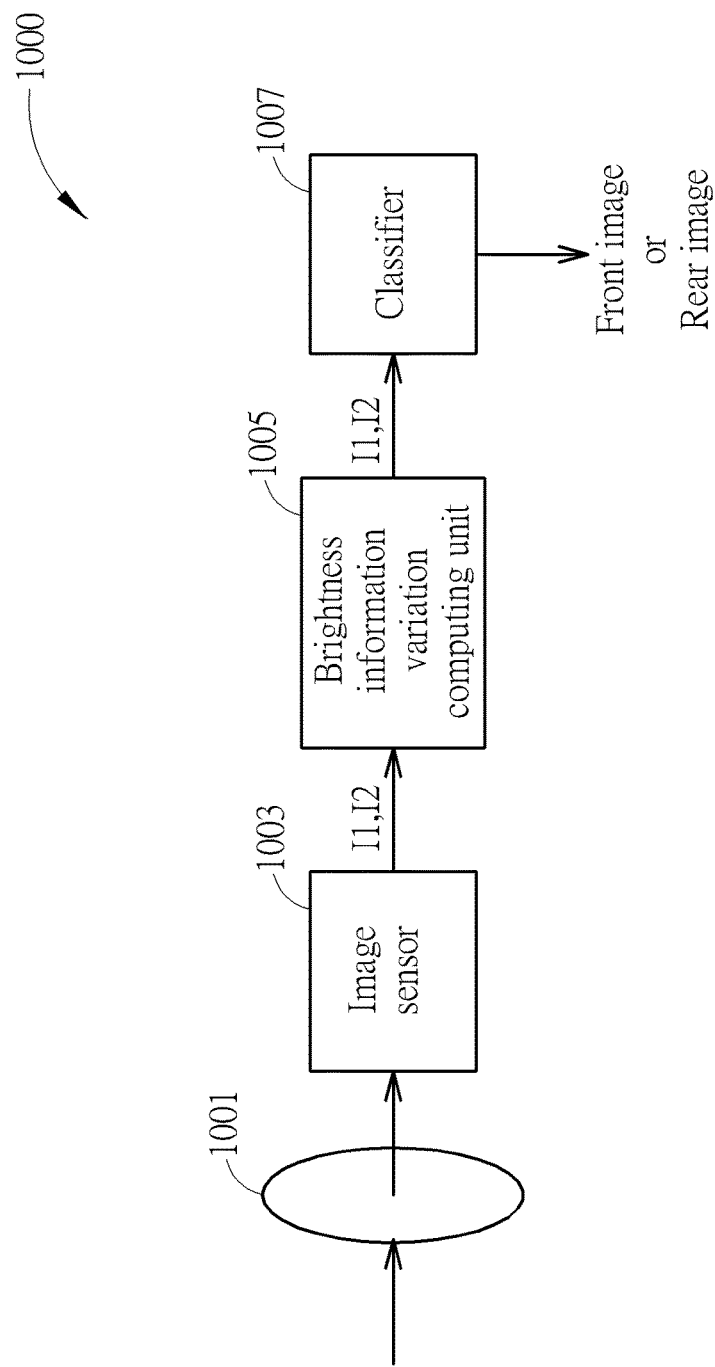
FIG. 10 is a block diagram illustrating an image sensing apparatus applying above-mentioned image determining methods, according to one embodiment of the present invention.

FIG. 10 is a block diagram illustrating an image sensing apparatus applying above-mentioned image determining methods, according to one embodiment of the present invention. As illustrated in FIG. 10, the image sensing apparatus 1000 comprises a lens 1001, an image sensor 1003, a brightness information variation computing unit 1005 and a classifier 1007. The image sensor 1003 can comprise part or all pixel structures illustrate in FIG. 2 or FIG. 3, to capture an image via the lens 1001. The image sensor 1003 generates images with different phases, for example, the first object image OI1 and the second object image OI2. The first object image OI1 and the second object image OI2 are combined to form a combined object image. The brightness information variation computing unit 1005 computes brightness information variation tendencies for the first object image I1 and the second object image I2 (ex. a slop or a ratio), and a brightness information variation tendency for the first combined object image as above-mentioned. After that, the classifier 1007 determines if the first combined object image is a front image or a rear image according to results from the brightness information variation computing unit 1005. The brightness information variation computing unit 1005 and the classifier 1007 can be combined to a processor. Additionally, the brightness information variation computing unit 1005 and the classifier 1007 can be implemented by a hardware or software.

Figure 11:
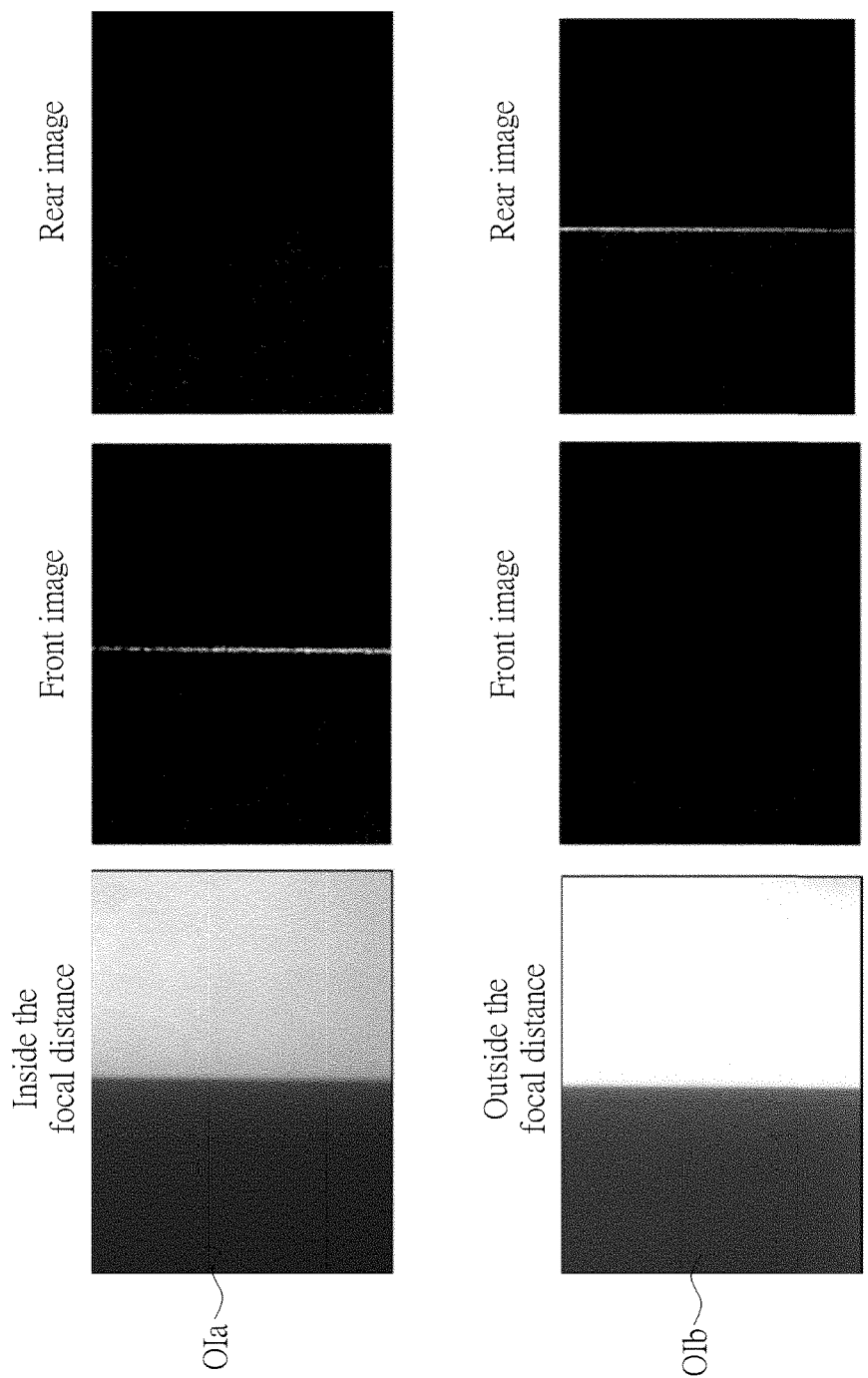
FIG. 11 is a schematic diagram illustrating a result for the image determining method according to one embodiment of the present invention.

FIG. 11 is a schematic diagram illustrating a result for the image determining method according to one embodiment of the present invention. As illustrated in FIG. 11, the object Oa is inside the focus distance, thus the combined object image thereof is determined to be a front image with edges, thus related contents thereof are not classified to a rear image. On the opposite, if the Oa is outside the focus distance, the combined object image thereof is determined to be a rear image with edges, and related contents thereof are not classified to a front image.

As above-mentioned, the classification for the front image and the rear image can be applied to determine a gesture. However, please note the image determining method provided by the present invention is not limited to determine a gesture.

In view of above-mentioned embodiments, the image determining method provided by the present invention can determine if the image is a front image or a rear image without consuming much power. Also, the range that can be determined is not limited. By this way, the disadvantage for prior, which means the power consumption is high and the distance cannot be determined if the object is closer to the image sensor, is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image determining method, applied to an image sensing apparatus comprising a lens and an image sensor comprising at least one first pixel and at least one second pixel, wherein a first part for each the first pixel is covered and a second part for each the second pixel is covered, the image determining method comprising:

(a) applying the first pixel to generate a first object image of an object;

(b) applying the second pixel to generate a second object image of the object, wherein the first object image and the second object image form a first combined object image;

(c) computing a first brightness information variation tendency for the first object image, a second brightness information variation tendency for the second object image, and a brightness information variation tendency for the first combined object image; and (d) determining if the first combined object image is a front image or a rear image according to the first brightness information variation tendency, the second brightness information variation tendency and the brightness information variation tendency for the first combined object image.

2. The image determining method of claim 1, wherein the step (c) comprises:
computing average brightness variation for each pixel line of the first object image to acquire the first brightness information variation tendency; and
computing average brightness variation for each pixel line of the second object image to acquire the second brightness information variation tendency.

3. The image determining method of claim 1, wherein the step (c) further comprises:
computing an average brightness ratio for a pixel line of the first object image and a pixel line of the second object image, wherein a relation between the pixel line of the first object image and the first object image, and a relation between the pixel line of the second object image and the second object image are the same;
wherein the step (c) further computes the first brightness information variation tendency and the second brightness information variation tendency according to the average brightness ratio.

4. The image determining method of claim 1, wherein the object comprises an edge part.

5. The image determining method of claim 1, wherein the first part is a left half part for the first image, and the second part is a right half part for the first pixel.

6. The image determining method of claim 1, wherein the first part is an upper half part for the first image, and the second part is a lower half part for the first pixel.

7. The image determining method of claim 1, wherein the first part is a upper right part for the first image, and the second part is a lower left part for the first pixel.

8. The image determining method of claim 1, wherein the image sensor further comprises at least one third pixel and at least one fourth pixel, wherein a third part for each the third pixel is covered and a fourth part for each the fourth pixel is covered, wherein the image determining method comprises:
applying the third pixel to generate a third object image of the object;
applying the fourth pixel to generate a fourth object image of the object, wherein the third object image and the fourth object image form a second combined object image;
computing a third brightness information variation tendency for the third object image, a fourth brightness information variation tendency for the fourth object image, and a brightness information variation tendency for the second combined object image; and
determining if the second combined object image is a front image or a rear image according to the third brightness information variation tendency, the fourth brightness information variation tendency and the brightness information variation tendency for the second combined object image.

9. An image sensing apparatus, comprising:
a lens;
an image sensor, comprising a lens and an image sensor comprising at least one first pixel and at least one second pixel, wherein a first part for each the first pixel is covered and a second part for each the second pixel is covered, wherein the image sensor applies the first pixel to generate a first object image of an object, and applies the second pixel to generate a second object image of the object, wherein the first object image and the second object image form a first combined object image;
a brightness information variation computing unit, configured to compute a first brightness information variation tendency for the first object image, a second brightness information variation tendency for the second object image, and a brightness information variation tendency for the first combined object image; and
a classifier, configured to determine if the first combined object image is a front image or a rear image according to the first brightness information variation tendency, the second brightness information variation tendency and the brightness information variation tendency for the first combined object image.

10. The image determining apparatus of claim 9, wherein the brightness information variation computing unit computes average brightness variation for each pixel line of the first object image to acquire the first brightness information variation tendency, and computes average brightness variation for each pixel line of the second object image to acquire the second brightness information variation tendency.

11. The image determining apparatus of claim 9, wherein the rightness information variation computing unit computes an average brightness ratio for a pixel line of the first object image and a pixel line of the second object image, wherein a relation between the pixel line of the first object image and the first object image, and a relation between the pixel line of the second object image and the second object image are the same;
wherein the rightness information variation computing unit further computes the first brightness information variation tendency and the second brightness information variation tendency according to the average brightness ratio.

12. The image determining apparatus of claim 9, wherein the object comprises an edge part.

13. The image determining apparatus of claim 9, wherein the first part is a left half part for the first image, and the second part is a right half part for the first pixel.

14. The image determining apparatus of claim 9, wherein the first part is an upper half part for the first image, and the second part is a lower half part for the first pixel.

15. The image determining apparatus of claim 9, wherein the first part is a upper right part for the first image, and the second part is a lower left part for the first pixel.

16. The image determining apparatus of claim 9,
wherein the image sensor further comprises at least one third pixel and at least one fourth pixel, wherein a third part for each the third pixel is covered and a fourth part for each the fourth pixel is covered:
wherein the image sensor applies the third pixel to generate a third object image of the object, and applies the fourth pixel to generate a fourth object image of the object, wherein the third object image and the fourth object image form a second combined object image;
wherein the brightness information variation computing unit computes a third brightness information variation tendency for the third object image, a fourth brightness information variation tendency for the fourth object image, and a brightness information variation tendency for the second combined object image;
wherein the classifier determines if the second combined object image is a front image or a rear image according to the third brightness information variation tendency, the fourth brightness information variation tendency and the brightness information variation tendency for the second combined object image.

\* \* \* \* \*